US008660837B2

(12) United States Patent
Funakoshi

(10) Patent No.: US 8,660,837 B2
(45) Date of Patent: Feb. 25, 2014

(54) LANGUAGE PROCESSOR

(75) Inventor: Kotaro Funakoshi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 552 days.

(21) Appl. No.: 12/723,956

(22) Filed: Mar. 15, 2010

(65) Prior Publication Data

US 2010/0241421 A1 Sep. 23, 2010

Related U.S. Application Data

(60) Provisional application No. 61/202,636, filed on Mar. 20, 2009.

(51) Int. Cl.
*G06F 17/27* (2006.01)
(52) U.S. Cl.
USPC .................................. 704/9; 704/1; 704/257
(58) Field of Classification Search
USPC .................................................. 704/1, 9, 257
See application file for complete search history.

(56) References Cited

U.S. PATENT DOCUMENTS

| | | | |
|---|---|---|---|
| 5,675,707 A * | 10/1997 | Gorin et al. | 704/257 |
| 6,185,527 B1 * | 2/2001 | Petkovic et al. | 704/231 |
| 6,349,276 B1 * | 2/2002 | McCarley | 704/8 |
| 7,860,706 B2 * | 12/2010 | Abir | 704/4 |
| 7,912,700 B2 * | 3/2011 | Bower et al. | 704/9 |
| 2005/0091038 A1 * | 4/2005 | Yi et al. | 704/10 |
| 2007/0255553 A1 * | 11/2007 | Nomoto | 704/9 |
| 2008/0288244 A1 * | 11/2008 | Gorin et al. | 704/9 |
| 2009/0076800 A1 * | 3/2009 | Li et al. | 704/10 |

OTHER PUBLICATIONS

Horacek, Helmut, "Generating Referential Descriptions Under Conditions of Uncertainty", University of Saarlandes, Saarbrucken, Germany, 2005.
Takunaga, et al., "Meaning of Japanese Spatial Nouns", Tokyo Institute of Technology, Tokyo, Japan, 2005.
Dale, et al., "Computational Interpretations of the Gricean Maxims in the Generation of Referring Expressions", Sep. 27, 1994.
Itti, et al., "A Model of Saliency-Based Visual Attention for Rapid Scene Analysis", IEEE Transactions on Pattern Analysis and Machine Intelligence, vol. 20, No. 11, Nov. 1998.

* cited by examiner

*Primary Examiner* — Eric Yen
(74) *Attorney, Agent, or Firm* — Squire Sanders (US) LLP

(57) ABSTRACT

A language processor according to the present invention includes a probability calculating section (103) having a probabilistic model by which a probability that a set of partial referring expression pairs represents an object, each pair consisting of an attribute value expression and a part expression modified by the attribute value expression, the set of referring expression pairs including a pair concerning the whole object, is represented by a product of probabilities each of which is a probability that each partial referring expression pair represents the object. The probability that each partial referring expression pair represents the object is obtained using a probability that the object is chosen, a probability that represents the salience of a part of the object, and a probability representing relevance between the part of the object and an attribute value, a probability that the part expression is used for a part of the object, and a probability that the attribute value expression is used for an attribute value. It further includes at least one memory section (101) for storing values of probabilities used for the probabilistic model. The probability calculating section calculates the probability that the set of partial referring expression pairs represents the object using the values of probabilities stored in the at least one memory section and the probabilistic model.

12 Claims, 7 Drawing Sheets

FIG. 3

| $o_3$ | $Pr(O=o_3)$ 0.5 | $Pr(P=p_1\|O=o_3)$ $p_1$ whole 0.5 | $Pr(P=p_1\|O=o_3)$ $p_2$ top-board 0.3 | $Pr(P=p_2\|O=o_3)$ $p_3$ leg 0.1 | ... |
|---|---|---|---|---|---|
| $a_1$ red | | 0.5 | 0.0 | 1.0 | ... |
| $a_2$ white | | 0.4 | 1.0 | 0.0 | ... |
| ... | | ... | ... | ... | ... |
| $a_k$ round | | 0.2 | 0.0 | 1.0 | ... |
| $a_{k+1}$ rectangle | | 0.9 | 1.0 | 0.0 | ... |
| ... | | ... | ... | ... | ... | color: $a_1, a_2$
shape: $a_k, a_{k+1}$

WORDS IN REFERRING EXPRESSIONS

| | red | white | green | blue | ... | top-plate | top-side | ... |
|---|---|---|---|---|---|---|---|---|
| $a_1$ red | 1.0 | 0.0 | 0.0 | 0.0 | ... | 0.0 | 0.0 | ... |
| $a_2$ white | 0.0 | 1.0 | 0.0 | 0.0 | ... | 0.0 | 0.0 | ... |
| $a_3$ blue | 0.0 | 0.0 | 0.0 | 1.0 | ... | 0.0 | 0.0 | ... |
| $a_4$ green | 0.0 | 0.0 | 0.8 | 0.2 | ... | 0.0 | 0.0 | ... |
| ... | ... | ... | ... | ... | ... | ... | ... | ... |
| $p_1$ whole | 0.0 | 0.0 | 0.0 | 0.0 | ... | 0.0 | 0.0 | ... |
| $p_2$ top-board | 0.0 | 0.0 | 0.0 | 0.0 | ... | 0.8 | 0.2 | ... |
| ... | ... | ... | ... | ... | ... | ... | ... | ... |

$Pr(e^a|a,o)$ — rows $a_1$–$a_4$
$Pr(e^p|p,o)$ — rows $p_1$–$p_2$ c

LANGUAGE PROCESSOR

REFERENCE TO RELATED APPLICATIONS

This application claims priority of U.S. Provisional Patent Application No. 61/202,636, filed on Mar. 20, 2009, the contents of which are hereby incorporated by reference.

BACKGROUND OF THE INVENTION

1. Field of the Invention

The present invention relates to a language processor using referring expressions and a probability calculating method used in language processing by the language processor.

2. Background Art

Assume that a robot communicates with a person using a speech dialogue system or the like and the person specifies a table by a referring expression "the white table with a red leg" in a room in which plural tables and chairs exist. Understanding of the referring expression means that a language processor of the robot identifies the table specified by the person. Generation of a referring expression means that the language processor of the robot generates a human-friendly expression which represents a table specified by the robot. Of course, referring expressions made by persons depend on knowledge of them and therefore the language processor of the robot is required to utilize information on the knowledge of persons in understanding and generation of referring expressions.

Generally, a language processor can use a probabilistic model to utilize information on knowledge of persons in understanding and generation of referring expressions.

Conventionally, it has been proposed to introduce a probabilistic model to overcome uncertainties due to discrepancies in knowledge and cognition between subjects (Horacek, H.: Generating referential descriptions under conditions of uncertainty, in Proc. The $10^{th}$ European Workshop on Natural Language Generation (ENLG) (2005)).

However, the probabilistic model described above is not designed in sufficient consideration of application to a real environment such as a communication between a person and a robot. In a real environment referring expressions representing objects with a complicated structure such as "the white table with a red leg" and "the white table with red corners" have to be handled. However, the probabilistic model described above is not designed in sufficient consideration of handling referring expressions representing objects with a complicated structure. Further, the probabilistic model described above cannot be used for generation of referring expressions.

Thus, a language processor using a probabilistic model which can handle referring expressions representing objects with a complicated structure and can be used both for understanding and generation of referring expressions has not been developed.

Accordingly there is a need for a language processor using a probabilistic model which can handle referring expressions representing objects with a complicated structure and can be used both for understanding and generation of referring expressions.

SUMMARY OF THE INVENTION

A language processor according to the first aspect of the present invention uses a probabilistic model. The language processor includes a probability calculating section having the probabilistic model by which a probability that a set of partial referring expression pairs represents an object, each pair consisting of an attribute value expression and a part expression modified by the attribute value expression, the set of referring expression pairs including a pair concerning the whole object, is represented by a product of probabilities each of which is a probability that each partial referring expression pair represents the object. The probability that each partial referring expression pair represents the object is obtained using a probability that the object is chosen, a salience probability that represents the salience of a part of the object, and a probability representing relevance between the part of the object and an attribute value, a probability of using the part expression that the part expression is used for a part of the object, and a probability of using the attribute value expression that the attribute value expression is used for an attribute value. The language processor further includes at least one memory section for storing values of salience probabilities of parts of respective objects, values of probabilities representing relevance between parts of respective objects and attribute values, values of probabilities of using part expressions and values of probabilities of using attribute value expressions. The probability calculating section calculates the probability that the set of partial referring expression pairs represents the object using values of probabilities stored in the at least one memory section and the probabilistic model.

Thus, the language processor according to the first aspect of the present invention is provided with the probabilistic model by which for a given object and a given set of partial referring expression pairs, a probability that the set of partial referring expression pairs represents the object can be obtained, and therefore can be used both for understanding and generation of referring expressions. Accordingly, separate models and separate data set for the models used respectively for understanding and generation of referring expressions are not necessary and therefore the language processor including a single model and data for the model can be prepared with efficiency.

Further, the language processor according to the first aspect of the present invention uses a set of partial referring expression pairs which includes expressions of the whole and parts of an object and attribute value expressions modifying the expressions of the whole and parts, and therefore can handle objects with a complicated structure. In other words, the language processor stores values of salience probabilities of parts of respective objects, values of probabilities representing relevance between parts of respective objects and attribute values, values of probabilities of using part expressions and values of probabilities of using attribute value expressions, which correspond to the set of partial referring expression pairs, and therefore can easily contain information on how persons express objects with a complicated structure.

A language processor according to the second aspect of the present invention uses a probabilistic model.

The language processor includes a probability calculating section having the probabilistic model by which a probability $$\Pr(o|e)$$

that an object is represented by a set of partial referring expression pairs, $$e = \{(e_1^p, e_1^a), (e_2^p, e_2^a), \ldots, (e_n^p, e_n^a)\}$$

each pair $(e_i^p, e_i^a)$ consisting of an attribute value expression and a part expression modified by the attribute value expression, the set of partial referring expression pairs including a pair concerning the whole object, is represented by a product of probabilities each of which is a probability $$\Pr(o|e_i^p, e_i^a)$$

that each partial referring expression pair represents the object. The probability that each partial referring expression pair represents the object is represented by a product of a probability $$Pr(o|e)$$

that the object is chosen, a product of a probability of using the part expression of the pair)

$$Pr(e_i^p|p_u,o)$$

that the part expression $e_i^p$ is used for a part $p_u$ of the object o, a probability of using the attribute value expression of the pair $$Pr(e_i^a|a_v,o)$$

that the attribute value expression $e_i^a$ is used for an attribute value $a_v$, a salience probability)

$$Pr(p_u|o)$$

that represents the salience of the part of the object, and a fitness probability)

$$Pr(a_v|p_u,o)$$

that represents the degree of fitness of the part of the object to the attribute value. The language processor further includes at least one memory section for storing values of salience probabilities of parts of respective objects, values of probabilities representing relevance between parts of respective objects and attribute values, values of probabilities of using part expressions and values of probabilities of using attribute value expressions. The probability calculating section calculates the probability that the set of partial referring expression pairs represents the object using values of probabilities stored in the at least one memory section and the probabilistic model.

Thus, the language processor according to the second aspect of the present invention is provided with the probabilistic model by which for a given object and a given set of partial referring expression pairs, a probability that the set of partial referring expression pairs represents the object can be obtained, and therefore can be used both for understanding and generation of referring expressions. Accordingly, separate models and separate data set for the models used respectively for understanding and generation of referring expressions are not necessary and therefore the language processor including a single model and data for the model can be prepared with efficiency.

Further, the language processor according to the second aspect of the present invention uses a set of partial referring expression pairs which includes expressions of the whole and parts of an object and attribute value expressions modifying the expressions of the whole and parts, and therefore can handle objects with a complicated structure. In other words, the language processor stores values of salience probabilities of parts of respective objects, values of salience probabilities of parts of respective objects, values of fitness probabilities, values of probabilities of using part expressions and values of probabilities of using attribute value expressions, which correspond to the set of partial referring expression pairs, and therefore can easily contain information on how persons express objects with a complicated structure.

In a language processor according to an embodiment of the present invention, the probability that the object is chosen can be changed according to the situation.

According to the embodiment, the probability that the object is chosen is obtained according to the situation such as an incidence in the preceding conversation such that the probability model can reflect the situation. Accordingly, the language processor can easily deal with the situation.

In a language processor according to an embodiment of the present invention, values of probabilities of using part expressions and values of probabilities of using attribute value expressions are determined commonly for respective objects.

According to the embodiment, amount of data stored in the memory section is reduced in comparison with the case in which the values are determined individually for respective kinds of objects.

In a language processor according to another embodiment of the present invention, values of probabilities of using part expressions and values of probabilities of using attribute value expressions are determined individually for respective kinds of objects.

According to the embodiment, characteristics of part expressions and attribute value expressions for respective kinds of objects can be reflected.

In a language processor according to another embodiment of the present invention, values of probabilities of using part expressions and values of probabilities of using attribute value expressions are determined individually for respective objects.

According to the embodiment, characteristics of part expressions and attribute value expressions for respective objects can be reflected.

A language processor according to an embodiment of the present invention further includes an object identifying section which when identifying the object represented by the set of partial referring expression pairs among potential objects for which probabilities that the potential objects are represented by the set of partial referring expression pairs are obtained using the probability calculating section, identifies the object with the maximum probability among the potential objects as the object represented by the set of partial referring expression pairs.

According to the embodiment, the object represented by the set of partial referring expression pairs is identified by the object identifying section based on the results of calculation using the probabilistic model.

A language processor according to an embodiment of the present invention further includes a structure analyzing section which generates at least one set of partial referring expression pairs from natural language According to the embodiment, at least one set of partial referring expression pairs to be used by the object identifying section is generated by the structure analyzing section.

In a language processor according to an embodiment of the present invention, the structure analyzing section generates plural sets of partial referring expression pairs as potential sets of partial referring expression pairs and the object identifying section identifies the object for which the probability that one of the plural sets of partial referring expression pairs represents the object is maximum, as the object that the one of the sets represents.

According to the embodiment, even when the structure analyzing section cannot determine a single set of partial referring expression pairs, the set of partial referring expression pairs and the object represented by the set can be identified using the probabilistic model.

A language processor according to an embodiment of the present invention further includes a referring expression selecting section which when selecting a set of partial referring expression pairs that represents an object among potential sets of partial referring expression pairs for which probabilities that the potential sets of partial referring expression pairs represent the object are obtained using the probability calculating section, selects the set of partial referring expression pairs for which the probability is maximum as the set of partial referring expression pairs representing the object.

According to the embodiment, the set of partial referring expression pairs representing the object is selected by the referring expression selecting section based on the results of calculation using the probabilistic model.

A language processor according to an embodiment of the present invention further includes a surface expression realizing section which generates a natural language expression from the set of partial referring expression pairs selected by the referring expression selecting section.

In the embodiment a natural language expression is generated by the surface expression realizing section from the set of partial referring expression pairs selected by the referring expression selecting section.

A probability calculating method according to the third aspect of the present invention is a method by which a probability that a set of partial referring expression pairs represents an object, each pair consisting of an attribute value expression and a part expression modified by the attribute value expression, the set of referring expression pairs including a pair concerning the whole object, is obtained in language processing by a language processor provided with a probability calculating section and at least one memory section. The probability calculating method includes the step of obtaining, by the probability calculating section, a probability that each partial referring expression pair represents the object using a probability that the object is chosen, a salience probability that represents the salience of a part of the object, and a probability representing relevance between the part of the object and an attribute value, a probability of using the part expression that the part expression is used for a part of the object, and a probability of using the attribute value expression that the attribute value expression is used for an attribute value, values of which are stored in the at least one memory section. The probability calculating method further includes the step of obtaining, by the probability calculating section, the probability that the set of partial referring expression pairs represents the object by obtaining a product of probabilities, each of which is the probability that each partial referring expression pair represents the object.

The probability calculating method according to the third aspect of the present invention can be used both for understanding and generation of referring expressions when an object and a set of partial referring expression pairs are given. Accordingly, separate data set respectively for understanding and generation of referring expressions are not necessary and therefore the language processor can be prepared with efficiency.

Further, the probability calculating method according to the third aspect of the present invention uses a set of partial referring expression pairs which includes expressions of the whole and parts of an object and attribute value expressions modifying the expressions of the whole and parts, and therefore can handle objects with a complicated structure. In other words, the probability calculating method according to the third aspect of the present invention uses values of salience probabilities of parts of respective objects, values of salience probabilities of parts of respective objects, values of fitness probabilities, values of probabilities of using part expressions and values of probabilities of using attribute value expressions, which correspond to the set of partial referring expression pairs, and therefore can easily contain information on how persons express objects with a complicated structure.

BRIEF DESCRIPTION OF THE DRAWINGS

FIG. 3 illustrates a construction of the first table containing a value of probability that the object is chosen, values of salience probabilities of parts of respective objects and values of relevance probabilities of parts of respective objects. The first table is provided for each object;

FIG. 4 illustrates a construction of the second table containing probabilities of using part expressions and probabilities of using attribute value expressions;

DETAILED DESCRIPTION OF THE INVENTION

Figure 1:
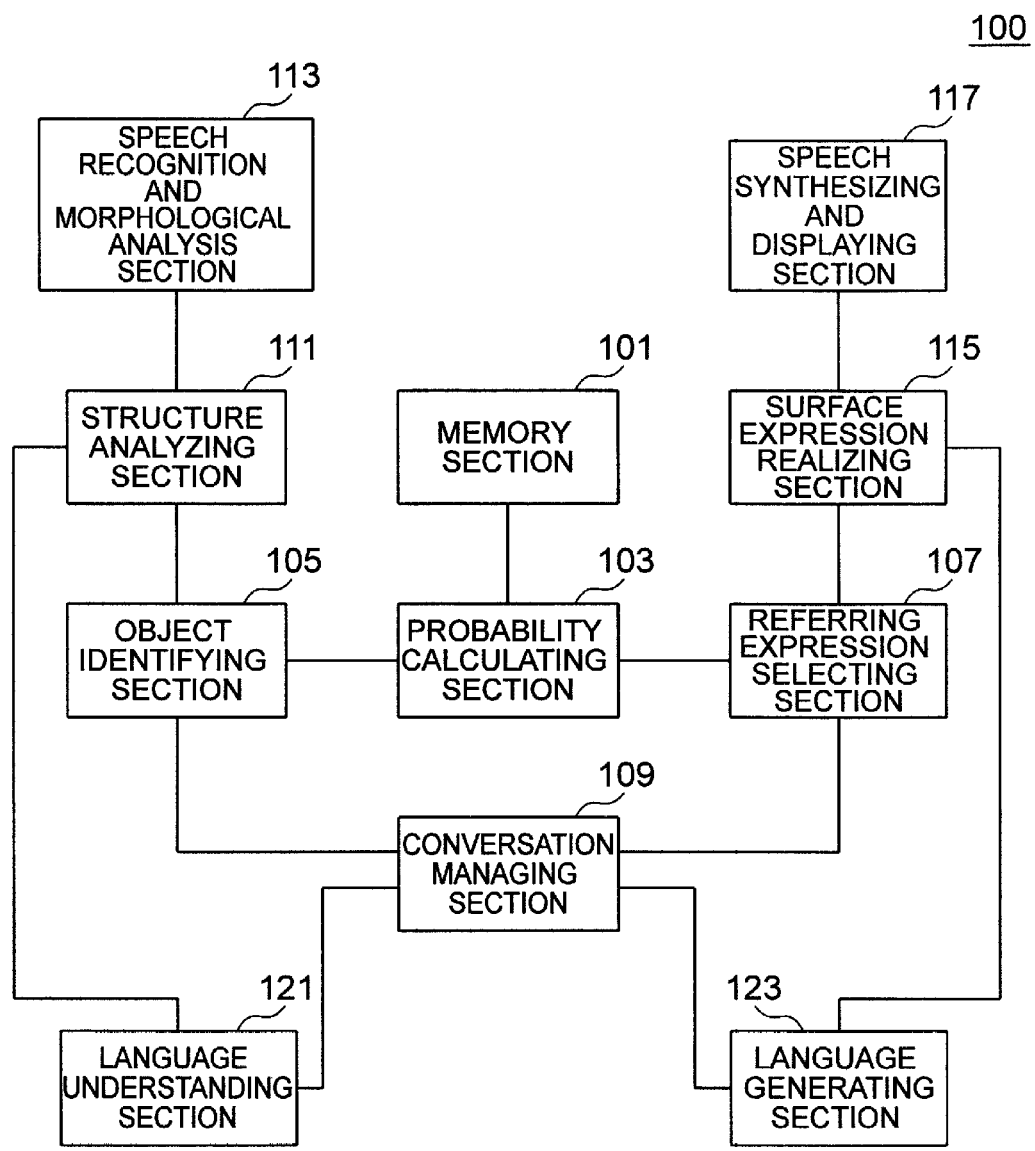
FIG. 1 illustrates a configuration of a language processor according to an embodiment of the present invention.

FIG. 1 illustrates a configuration of a language processor 100 according to an embodiment of the present invention. The language processor 100 may be formed by one or plural processors and one or plural memories.

The language processor 100 includes a memory section 101, a probability calculating section 103, an object identifying section 105 and a referring expression selecting section 107 as distinctive components. When a referring expression and an object are given, the probability calculating section 103 calculates a probability that the referring expression represents the object based on a probabilistic model. The memory section 101 stores a table including data used by the probabilistic model. In understanding of a referring expression, that is, in identifying the object represented by the referring expression, the object identifying section 105 obtains probabilities that the referring expression represents potential objects from the probability calculating section 103 and identifies the object with the maximum probability among the potential objects as the object represented by the referring expression. In generation of a referring expression, that is, in selecting a referring expression which represents an object, the referring expression selecting section 107 obtains probabilities that potential referring expressions represent the object from the probability calculating section 103 and selects the referring expression with the maximum probability among the potential referring expressions as the referring expression which represents the object. The distinctive components described above will be described in further detail later.

A speech recognition and morphological analysis section 113 recognizes human speech, divides the speech into morphemes and determines their parts of speech using a dictionary. A structure analyzing section 111 analyzes a sentence structure based on information of morphemes obtained by the speech recognition and morphological analysis section 113.

Figure 2:
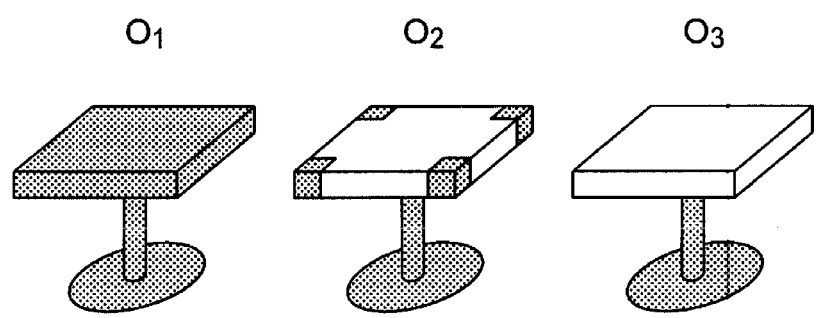
FIG. 2 shows examples of objects to be represented by referring expressions.

FIG. 2 shows examples of objects to be represented by referring expressions. More specifically, FIG. 2 shows three kinds of tables. In FIG. 2 dotted portions are assumed to be red. The speech recognition and morphological analysis section 113 analyzes a referring expression "the white table with a red leg" which represents $O_3$ and recognizes it as a combination of "the" (article), "white" (adjective), "table" (noun), "with" (preposition), "a" (article), "red" (adjective) and "leg" (noun). Then the structure analyzing section 111 recognizes a structure of {("table", "white"), ("leg", "red")}. The structure includes information that "white" modifies "table", "red" modifies "leg" and "leg" is a part of "table".

In the present invention an object is generally represented by a set of partial referring expression pairs, $$e=\{(e_1^p,e_1^a),(e_2^p,e_2^a),\ldots,(e_n^p,e_n^a)\} \quad (1)$$

where each pair $(e_i^p, e_i^a)$ consists of an attribute value expression $e_i^a$ and a part expression $e_i^p$ modified by the attribute value expression. The above described set of referring expression pairs includes a part expression of the whole object and a corresponding attribute value expression. Thus, in the specification and claims the term "part" refers to one of the whole and the parts in some cases.

For example, "leg" is a part expression representing a part of a table which is the object while "table" is another part expression representing the whole of the table which is the object. Thus, part expressions are nouns representing substances. Further, "white" is an attribute value expression which modifies a part expression, such as "table", for example. Attribute value expressions are adjectives or the like which modify nouns.

{("table", "white"), ("leg", "red")} described above is an example of a set of partial referring expression pairs in the form of Equation (1). Thus, objects with a complicated structure can be handled by the use of a set of partial referring expression pairs of each of the objects. Such a set of partial referring expression pairs is sent to the object identifying section 105 in which the object is identified.

A surface expression realizing section 115 receives a set of partial referring expression pairs such as {("table", "white"), ("leg", "red")} selected by the referring expression selecting section 107 and generates an expression of natural language such as "the white table with a red leg". A speech synthesizing and displaying section 117 performs speech synthesis of the expression of natural language or displays it.

The language processor further includes a language understanding section 121, a language generating section 123 and a conversation managing section 109. The language understanding section 121 receives the results of structure analysis from the structure analyzing section 111, performs processing for understanding language except processing of referring expressions performed by the object identifying section 105 and sends the results to the conversation managing section 109. The language generating section 123 performs processing for generating language except selection of referring expressions performed by the referring expression selecting section 107 and sends the results to the surface expression realizing section 115. The conversation managing section 109 receives from the object identifying section 105 objects which referring expressions represent, receives from the language understanding section 121 the results of processing for understanding language except processing of referring expressions performed by the object identifying section 105 and performs processing of the received inputs. The conversation managing section 109 generates outputs based on the inputs and other conditions and sends the outputs to the referring expression selecting section 107 and the language generating section 123. The referring expression selecting section 107 receives the outputs of the conversation managing section 109 and selects a proper referring expression. The language generating section 123 receives the outputs of the conversation managing section 109 and performs processing for generating language except selection of referring expressions performed by the referring expression selecting section 107.

A probabilistic model provided in the probability calculating section 103 will be described below. The probabilistic model is used to determine a probability Pr(o|e)

that a set of partial referring expression pairs, $$e=\{(e_1^p,e_1^a),(e_2^p,e_2^a),\ldots,(e_n^p,e_n^a)\} \quad (1)$$

in which each pair $(e_i^p, e_i^a)$ consists of an attribute value expression $e_i^a$ and a part expression $e_i^p$ modified by the attribute value expression, represents an object. $e_1^p$ represents the whole expression. A probability that a partial referring expression pair $(e_i^p, e_i^a)$ represents the object is expressed as below.

Pr(o|$e_i^p$,$e_i^a$)

Then the following equation is obtained.

$$Pr(o|e) \approx N \prod_i Pr(o|e_i^p, e_i^a) \quad (2)$$

In other words, a probability that a set of partial referring expression pairs represents an object is expressed by a product of probabilities each of which is a probability that each partial referring expression pair $(e_i^p, e_i^a)$ of the set of partial referring expression pairs represents the object and a normalization coefficient N.

Then a probability that a partial referring expression pair represents the object is expressed by the following equation according to Bayes' rule.

$$Pr(o|e_i^p, e_i^a) = \frac{Pr(o)Pr(e_i^p, e_i^a|o)}{Pr(e_i^p, e_i^a)} \quad (3)$$

In other words, a probability that a partial referring expression pair represents the object is expressed by a product of a probability that the object is chosen and a probability that the partial referring expression pair is used for the object.

The denominator in the right side of Equation (3) represents a normalization coefficient, which is expressed by the following equation.

$$Pr(e_i^p, e_i^a) = \sum_o Pr(e_i^p, e_i^a|o) \quad (4)$$

The probability that the partial referring expression pair is used for the object is expressed by the following equation.

$$Pr(e_i^p, e_i^a|o) = \sum_u \sum_v \frac{Pr(e_i^p|p_u, o)Pr(e_i^a|a_v, o)}{Pr(a_v|p_u, o)Pr(p_u|o)} \quad (5)$$

In other words, the probability that the partial referring expression pair is used for the object is expressed by a product of a probability of using the part expression of the pair Pr($e_i^p$|$p_u$,o)

that the part expression $e_i^p$ is used for a part $p_u$ of the object o, a probability of using the attribute value expression of the pair Pr($e_i^a$|$a_v$,o)

that the attribute value expression $e_i^a$ is used for an attribute value $a_v$, a salience probability)

Pr($p_u$|o)

that represents the salience of the part of the object, and a fitness probability $$\Pr(a_v|p_u,o)$$

that represents the degree of fitness of the part of the object to the attribute value. The probabilistic model is constructed as described above.

The memory section 103 stores data used for calculation of Equations (3) to (5) of the probabilistic model. More specifically, the memory section 103 is provided with a first table containing a value of probability that each object is chosen, values of salience probabilities of parts of the object and values of salience probabilities of parts of the object and a second table containing values of probabilities of using part expressions and values of probabilities of using attribute value expressions.

Probabilities that objects are chosen Pr(o) is the prior probability that the object o is chosen. Probabilities that an object is chosen may be set to a fixed value which is the inverse of the number of the objects assuming that the probabilities of all the objects are equal. Alternatively, the probabilities may be set to fixed values which are obtained based on some assumption. Alternatively, the probabilities may be obtained according to the situation such as an incidence in the preceding conversation. Alternatively, if potential functions such as used in (Tokunaga, T., Koyma, T., and Saito, S.: Meaning of Japanese spatial nouns, in Proc. The Second ACL-SIGSEM Workshop on The Linguistic Dimensions of Prepositions and their Use in Computational Linguistics Formalisms and Applications, pp. 93-100 (2005)) are used for computing the probabilities, objects, which are equally relevant to a given referring expression, can be ranked according to distances from interlocutors.

A salience probability $\Pr(p_u|o)$ of a part of the object represents the salience, that is, degree of prominence of the part in the object. This represents some kind of implication concerning pragmatics that "If some part of an object is mentioned, it should be more salient than other parts." This is related to Gricean maxims (Dale, R and Reiter, E.: Computational Interpretations of the Gricean Maxims in the Generation of Referring Expressions, Cognitive Science, Vol. 18, pp. 233-263 (1995)). A salience probability of a part of the object may be estimated using the saliency map which is proposed as a model of human visual attention (Itt, L., Koch, C., and Niebur, E.: A Model of Saliency-Based Visual Attention for Rapid Scene Analysis, IEEE Transactions on Pattern Analysis and Machine Intelligence, Vol. 20, No. 11, pp. 1254-1259 (1998)) or the like.

A fitness probability $\Pr(a_v|p_u,o)$ represents the relevance of the part of the object to the attribute value, that is, the degree of fitness of the part of the object to the attribute value. For example, assuming that "a" is an attribute value meaning red and "p" represents the whole object, the fitness probability $\Pr(a_v|p_u,o)$ has a value of 1 for the table the whole of which is red ($O_1$ in FIG. 2) and has a value of 0.5 for the table only a half of which is red ($O_3$ in FIG. 2).

FIG. 3 illustrates a construction of the first table containing a value of probability that the object is chosen, values of salience probabilities of the parts of the object and values of fitness probabilities of the parts of the object. The first table is provided for each object. The table of FIG. 3 is one representing object $O_3$ in FIG. 2.

In the table the second column and the columns on the right side of the second column correspond to the whole and parts of the object. For example, the second column corresponds to "whole" which means the whole while the third column corresponds to "top-board" which is a part of the object. In the table the second row and the rows below the second row correspond to respective attribute values. For example, the second row corresponds to "red" which is an attribute value of "color" while the third row corresponds to "white" which is an attribute value of "color". For example, a value of 0.4 at the cross-point of the third row and the second column indicates that the fitness probability that represents the degree of fitness of the whole ($p_1$) of the object $O_3$ to the attribute value "white" ($a_2$)" is 0.4. The values at the cross-points of the second row and the rows below the second row and the second column and the columns on the right side of the second column (the values in box B) are between 0 and 1.

The first row shows a value of probability that the object is chosen and values of salience probabilities of the whole and the parts. More specifically, a value of 0.5 at the cross-point of the first row and the first column indicates that a probability that the object is chosen is 0.5. Further, a value of 0.3 at the cross-point of the first row and the third column indicates that a salience probability of the part "top-board" is 0.3. The sum of the values at the cross-points of the first row and one of the second column and the columns on the right side of the second column (the values in box A) is 1.

FIG. 4 illustrates a construction of the second table containing probabilities of using part expressions and probabilities of using attribute value expressions. The second table may be provided commonly for all the objects. Alternatively, it may be provided individually for respective kinds of objects, such as tables and chairs. Alternatively, it may be provided individually for respective objects, such as each table and each chair.

In the second table the second row and the rows below the second row correspond to attributes and the whole and the parts of the object. In the second table the second column and the columns on the right side of the second column correspond to words used in referring expressions. In the first table and the second table attribute values and the whole and the parts of the object are underlined while part expressions and attribute value expressions are not underlined. For example, a value 1.0 at the cross-point of the second row and the second column indicates that a possibility that the attribute value expression "red" is used for the attribute value red is 1.0. A value 0.0 at the cross-point of the second row and the third column indicates that a possibility that the attribute value expression "white" is used for the attribute value red is 0.0. Further, a value of 0.8 at the cross-point of the eighth row and the seventh column indicates that a possibility that the part expression "top-plate" is used for the part top-board is 0.8 while a value of 0.2 at the cross-point of the eighth row and the eighth column indicates that a possibility that the part expression "top-side" is used for the part top-board is 0.2. In any one of the second row and the rows below the second row the sum of values at the cross points with the second column and the columns on the right side of the second column is 1. More specifically, values of probabilities that respective part expressions are used for the part "top-board" are described at the cross-points of the eighth row and one of the second column and the columns on the right side of the second column and the sum of the values (the values in box C) is 1.

Generally, the values of probabilities contained in the second table can be determined using corpus.

Figure 5:
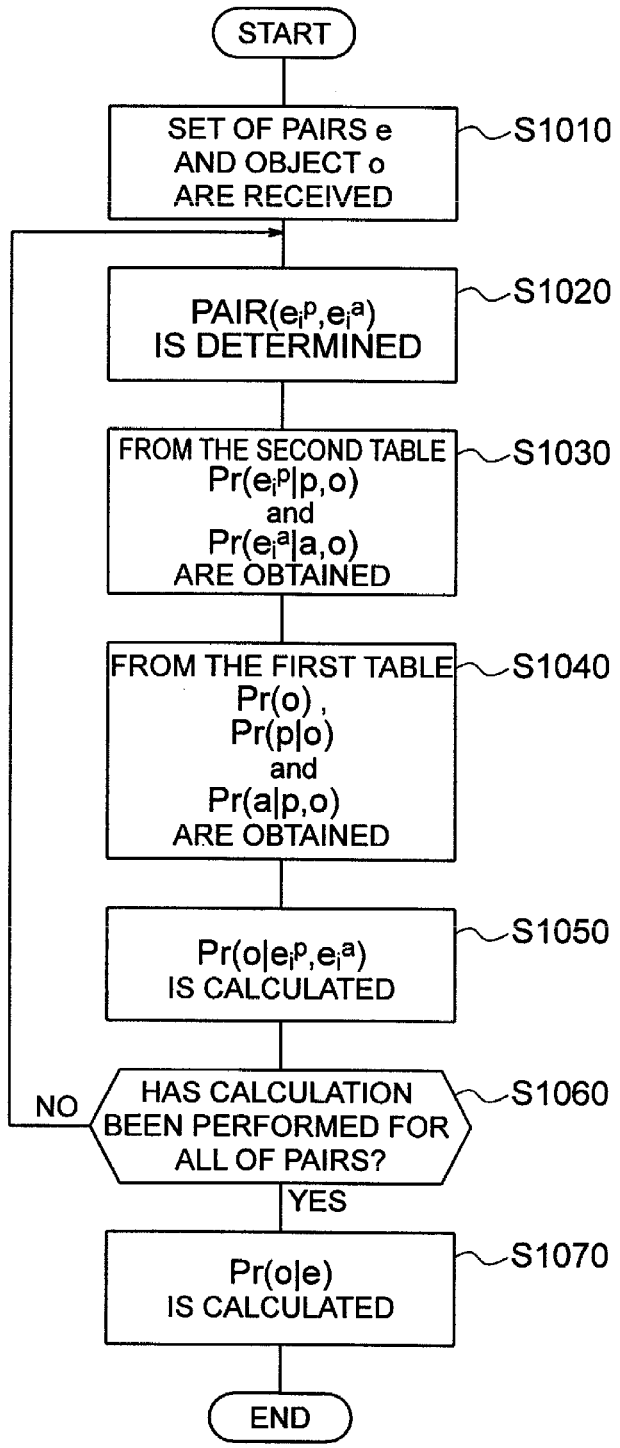
FIG. 5 is a flow chart for illustrating operation of the action selecting section.

FIG. 5 is a flow chart showing the process performed by the probability calculating section 103.

In step S1010 in FIG. 5, the probability calculating section 103 receives an object o and a set of partial referring expression pairs.

$$e=\{(e_1^p,e_1^a),(e_2^p,e_2^a),\ldots,(e_n^p,e_n^a)\}$$

In step S1020 in FIG. 5, the probability calculating section 103 determines a partial referring expression pair $(e_i^p, e_i^a)$.

In step S1030 in FIG. 5, the probability calculating section 103 obtains from the second table a probability of using a part expression of the pair)

$$Pr(e_i^p | p_u, o)$$

that the part expression $e_i^p$ is used for a part $p_u$ of the object o and a probability of using an attribute value expression of the pair $$Pr(e_i^a | a_v, o)$$

that the attribute value expression $e_i^a$ is used for an attribute value $a_v$.

In step S1040 in FIG. 5, the probability calculating section 103 obtains from the first table, a probability that the object is chosen $$Pr(o),$$

a salience probability)

$$Pr(p_u | o)$$

that represents the salience of the part of the object, and a fitness probability $$Pr(a_v | p_u, o)$$

that represents the degree of fitness of the part of the object to the attribute value. As described above, the probability that the object is chosen may be obtained according to the situation such as an incidence in the preceding conversation.

In step S1050 in FIG. 5, the probability calculating section 103 calculates a probability that the partial referring expression pair is used for the object $Pr(o | e_i^p, e_i^a)$ using Equations (3) to (5).

In step S1060 in FIG. 5, the probability calculating section 103 determines whether or not calculation has been performed for all of the partial referring expression pairs. If calculation has been performed for all of the partial referring expression pairs, the process goes to step S1070. If calculation has not been performed for all of the partial referring expression pairs, the process returns to step S1020.

In step S1070 in FIG. 5, the probability calculating section 103 calculates a probability that the set of partial referring expression pairs represents the object $Pr(o | e)$ using Equation (2).

Figure 6:
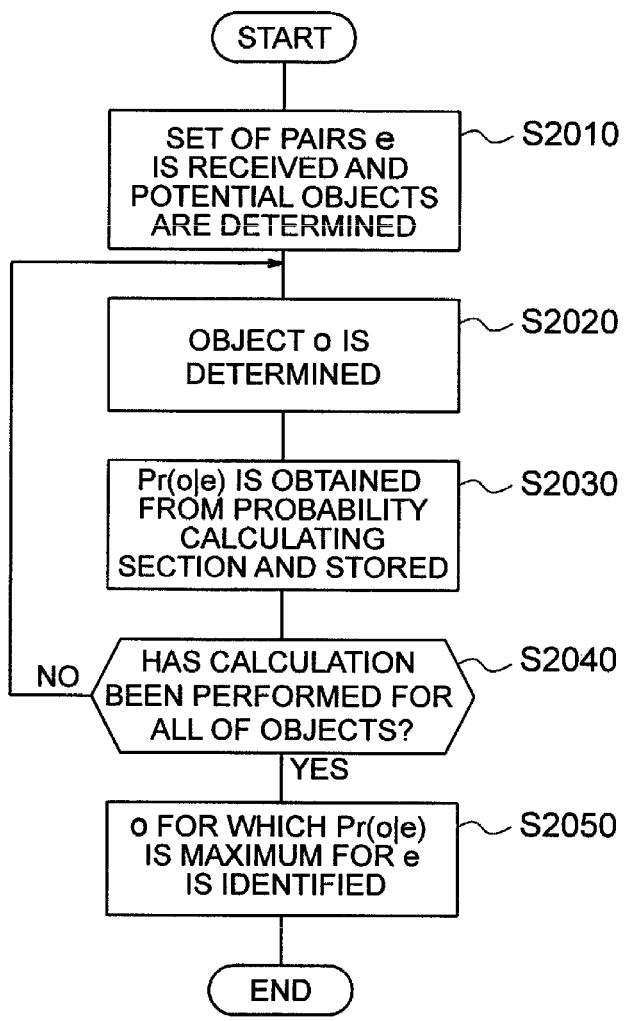
FIG. 6 is a flow chart showing the process performed by the object identifying section.

FIG. 6 is a flow chart showing the process performed by the object identifying section 105.

In step S2010 in FIG. 6, the object identifying section 105 receives a set of partial referring expression pairs e and determines potential objects.

In step S2020 in FIG. 6, the object identifying section 105 determines an object o.

In step S2030 in FIG. 6, the object identifying section 105 sends the set of partial referring expression pairs e and the object o to the probability calculating section 103 and then obtains a probability that the set of partial referring expression pairs represents the object $Pr(o | e)$ from the probability calculating section 103 and temporarily stores the probability.

In step S2040 in FIG. 6, the object identifying section 105 determines whether or not calculation has been performed for all of the objects. If calculation has been performed for all of the objects, the process goes to step S2050. If calculation has not been performed for all of the objects, the process returns to step S2020.

In step S2050 in FIG. 6, the object identifying section 105 identifies the object for which a probability that the set of partial referring expression pairs represents the object $Pr(o | e)$ is maximum. Thus, the object which is represented by the received set of partial referring expression pairs is identified.

When there exist plural potential sets of partial referring expression pairs, for each potential set the object for which $Pr(o | e)$ is maximum may be identified and among the potential sets and the corresponding objects the set and the corresponding object for which $Pr(o | e)$ is maximum may be identified. By such a process, even when the structure analyzing section 111 cannot determine a single set of partial referring expression pairs, the set of partial referring expression pairs and the object represented by the set can be identified.

Figure 7:
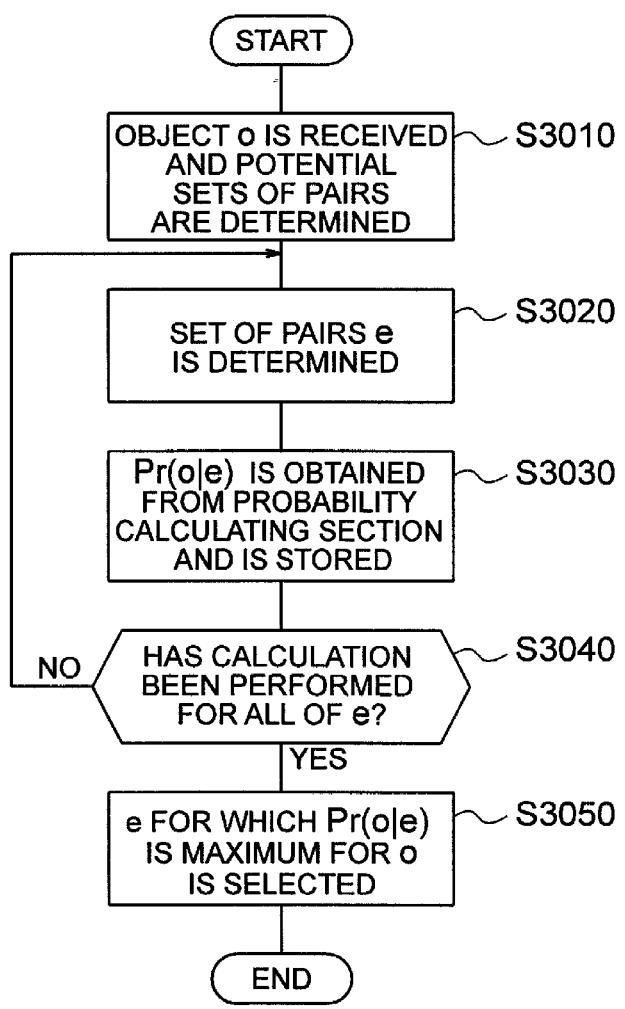
FIG. 7 is a flow chart showing the process performed by the referring expression selecting section.

FIG. 7 is a flow chart showing the process performed by the referring expression selecting section 107.

In step S3010 in FIG. 7, the referring expression selecting section 107 receives an object O and determines potential sets of partial referring expression pairs.

In step S3020 in FIG. 7, the referring expression selecting section 107 determines a set of partial referring expression pairs e.

In step S3030 in FIG. 7, the referring expression selecting section 107 sends the set of partial referring expression pairs e and the object o to the probability calculating section 103 and then obtains a probability that the set of partial referring expression pairs represents the object $Pr(o | e)$ from the probability calculating section 103 and temporarily stores the probability.

In step S3040 in FIG. 7, the referring expression selecting section 107 determines whether or not calculation has been performed for all of the sets of partial referring expression pairs. If calculation has been performed for all of the sets of partial referring expression pairs, the process goes to step S3050. If calculation has not been performed for all of the sets of partial referring expression pairs, the process returns to step S3020.

In step S3050 in FIG. 7, the referring expression selecting section 107 selects the set of partial referring expression pairs for which a probability that the set of partial referring expression pairs represents the object $Pr(o | e)$ is maximum. Thus, the set of partial referring expression pairs which is most appropriate for the received object is selected.

What is claimed is:

1. A language processor using a probabilistic model, comprising:
a probability calculating section comprising the probabilistic model, the probability calculating section configured to determine a probability that a set of partial referring expression pairs represents at least one object, wherein the probability is determined by calculating a product of probabilities, wherein each individual probability of the probabilities is a probability that a partial referring expression pair represents one of the at least one object or a part of an object, each pair comprising an attribute value expression and a part expression modified by the attribute value expression,
wherein each individual probability of the probabilities is obtained using a probability that the at least one object is chosen, a salience probability that represents the salience of a part of the at least one object, a probability representing relevance between the part of the at least one object and an attribute value, a probability that the part expression of a given pair is used for a part of the at least one object, and a probability that the attribute value expression of the given pair is used for an attribute value;
at least one memory section configured to store salience probabilities of parts of the at least one object, probabilities representing relevance between the parts of the at least one object and attribute values, probabilities of using part expressions and values of probabilities of using attribute value expressions,
wherein the probability calculating section is configured to calculate the probability that the set of partial referring expression pairs represents the at least one object using values of probabilities stored in the at least one memory section.

2. The language processor according to claim 1, wherein the probability that the at least one object is chosen can be changed according to the situation.

3. The language processor according to claim 1, wherein values of probabilities of using part expressions and values of probabilities of using attribute value expressions are determined in a same manner for an object.

4. The language processor according to claim 1, wherein values of probabilities of using part expressions and values of probabilities of using attribute value expressions are determined individually for different kinds of the at least one object.

5. The language processor according to claim 1, wherein values of probabilities of using part expressions and values of probabilities of using attribute value expressions are determined individually for the at least one object.

6. The language processor according to claim 1, further comprising an object identifying section configured to identify at least one object represented by the set of partial referring expression pairs, the at least one object represented by the set of partial referring expression pairs being among potential objects, wherein probabilities that the potential objects are represented by the set of partial referring expression pairs are obtained using the probability calculating section,
wherein the object identifying section identifies at least one object with a maximum probability among the potential objects as the object represented by the set of partial referring expression pairs.

7. The language processor according to claim 6, further comprising a structure analyzing section configured to generate at least one set of partial referring expression pairs from natural language.

8. The language processor according to claim 7, wherein the structure analyzing section is further configured to generate plural sets of partial referring expression pairs as potential sets of partial referring expression pairs, and wherein the object identifying section is further configured to identify at least one object with a maximum probability that one of the plural sets of partial referring expression pairs represents the object.

9. The language processor according to claim 1, further comprising a referring expression selecting section configured to:
select a set of partial referring expression pairs, among potential sets of partial referring expression pairs, that represents the at least one object; and
send the selected set of partial referring expression pairs to the probability calculating section to obtain a probability that the selected set of partial referring expression pairs represent the at least one object,
wherein the referring expression selecting section is further configured to select a set of partial referring expression pairs having a maximum probability of representing the at least one object, as the set of partial referring expression pairs selected from among the potential sets of partial referring expression pairs.

10. The language processor according to claim 9, further comprising a surface expression realizing section which generates a natural language expression from the set of partial referring expression pairs selected by the referring expression selecting section.

11. A language processor using a probabilistic model, comprising:
a probability calculating section comprising the probabilistic model, the probability calculating section configured to determine a probability $$\Pr(o|e)$$

where o is an object, that a set of partial referring expression pairs represents an object, $$e=\{(e_1^p,e_1^a),(e_2^p,e_2^a),\ldots,(e_n^p,e_n^a)\}$$

each pair $(e_i^p,e_i^a)$ comprising an attribute value expression and a part expression modified by the attribute value expression, the set of partial referring expression pairs comprising a pair concerning the object, wherein the probability that the object is represented by the set of partial referring expression pairs is determined by calculating a product of probabilities, wherein each individual probability of the probabilities is a probability $$\Pr(o|e_i^p,e_i^a)$$

that a partial referring expression pair represents the object, and is represented by a product of a probability the object is chosen, a probability of using the part expression of the pair $$\Pr(e_i^p|p_u,o)$$

that the part expression $e_i^p$ is used for a part $p_u$ of the object o, where u is an index for the part $p_u$, a probability of using the attribute value expression of the pair $$\Pr(e_i^a|a_v,o)$$

that the attribute value expression $e_i^a$ is used for an attribute value $a_v$ where v is an index for the attribute value $a_v$, a salience probability $$\Pr(p_u|o)$$

that represents the salience of the part of the object, and a fitness probability $$\Pr(a_v|p_u,o)$$

that represents the degree of fitness of the part of the object to the attribute value;
at least one memory section configured to store salience probabilities of parts of the object, fitness probabilities, probabilities of using part expressions and probabilities of using attribute value expressions,
wherein the probability calculating section is configured to calculate the probability that the set of partial referring expression pairs represents the object using values of probabilities stored in the at least one memory section.

12. A probability calculating method for determining a probability that a set of partial referring expression pairs represents an object, each pair comprising an attribute value expression and a part expression modified by the attribute value expression, the set of partial referring expression pairs including a pair concerning a whole of the object, wherein the probability is obtained in a language processor provided with a probability calculating section and at least one memory section, the method comprising the steps of:
for each partial referring expression pair, obtaining, by the probability calculating section, a probability that a partial referring expression pair represents the object, wherein the obtaining of a probability that a partial referring expression pair represents the object comprises using a probability that the object is chosen, a salience probability that represents salience of a part of the object, a probability representing relevance between the part of the object and an attribute value, a probability that the part expression for a given pair is used for a part of the object, and a probability that the attribute value expression for a given pair is used for an attribute value, wherein values of the probability that the object is chosen, values of the salience probability that represents salience of the part of the object, values of the probability representing relevance between the part of the object and the attribute value, values of the probability that the part expression for the given pair is used for the part of the object, and values of the probability that the attribute value expression for the given pair is used for the attribute value are stored in the at least one memory section; and obtaining, by the probability calculating section, the probability that the set of partial referring expression pairs represents the object by obtaining a product of probabilities, each individual probability of the product of probabilities is one of the probabilities obtained by the probability calculating section.

\* \* \* \* \*